United States Patent Office 3,172,021
Patented Mar. 2, 1965

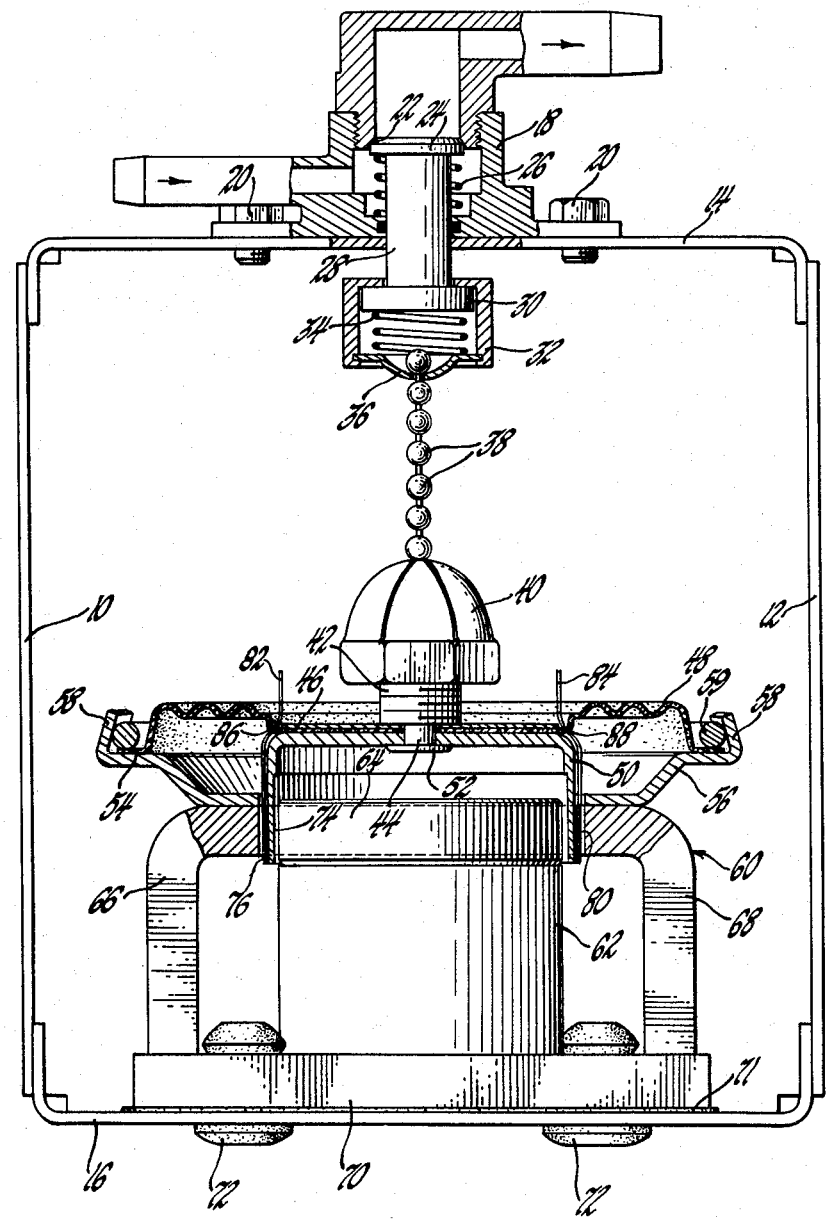

3,172,021
MAGNETIC TRANSDUCER ARRANGEMENT
Max J. Manahan, Kokomo, Ind., assignor to General Motors Corporation, Detroit, Mich., a corporation of Delaware
Filed Dec. 18, 1961, Ser. No. 159,861
6 Claims. (Cl. 317—173)

This invention relates to magnetically operated apparatus and more particularly to a transducer arrangement capable of receiving a signal in the form of a varying electrical current and effecting a corresponding movement in a control unit of a control device such as a valve.

In vehicular heating and/or air conditioning systems, dampers and other controlling units must be accurately positioned and continually adjusted to achieve results which are not erratic but properly modulated to suit conditions. For example, a damper for controlling a flow of heated air through a conduit to a passenger compartment may be fully opened, partly opened or fully closed. Any intermediate position of the damper must be precisely adjusted if the flow of air is to be properly modulated in accordance with requirements within the vehicle. Sensing devices such as thermistors may be used to indicate temperature conditions to be combated or maintained. Current changes from thermistors due to temperature changes may pass through an amplifier giving a changing current signal. The problem then is to change that signal to a damper motion which is substantially in accordance with the strength of the signal. The damper may be actuated against the force of a spring by a diaphragm operated vacuum motor exerting a force proportional to the degree of vacuum. Vacuum motors are disclosed for operating dampers in the United States Patent No. 2,963,954, granted December 13, 1960, in the name of Albert D. Baker. Whether the modus operandi of the dampers be by vacuum, air above atmospheric pressure, a second circuit, or by hydraulic pressure, the control of that modus operandi should be well modulated in accordance with the signal.

An object of the present invention is to provide a low-cost, simple and reliable transducer arrangement capable of changing a signal in the form of variable electrical current to movement in a control unit thereby effecting a sensitive modulated control.

A feature of the present invention is a transducer employing a motor having two relatively movable components, one including a permanent magnet and the other comprising an electro-magnetic coil and which is mechanically coupled to a control unit biased in one direction by spring means.

These and other important features of the invention will now be described in detail in the specification and then pointed out more particularly in the appended claims.

The drawing shows an elevational view of a vacuum control valve operatively connected to an actuating device in the form of a solenoid type motor, portions being in section and the arrangement constituting an embodiment of the present invention.

A magnetic transducer arrangement is disclosed with relation to a supporting box structure having side walls 10 and 12, a top wall 14 and a bottom wall 16. On the top 14 of the box structure is shown a vacuum valve 18 fixed to the box structure by means of bolts 20. The valve is provided with an inner seat 22 and a valve or control element 24 adapted to seat thereon by virtue of force exerted upon it by a spring 26. This spring surrounds a plunger 28 joined to the control element 24. The exposed end of the plunger has a circular head 30 retained within a coupling member 32. The latter is so made as to enclose a coil spring 34 through the help of a spring disk 36 of sheet metal. The latter is slotted to receive at least one element of a ball chain 38. The other end of the chain 38 is retained within an acorn type nut 40 threaded to an aluminum stud 42. The latter bears a reduced diameter portion 44 which passes through an aluminum disk 46, the central portion of a plastic impregnated and embossed cloth disk 48 as well as the bottom portion of an aluminum inverted cup 50. The disk 48 may be of paper but it should be of such resiliency as to support and guide the cup 50 for movement in a path in axial alignment with the valve 24. The disk 48 may be called a spider and is similar to such elements as are customarily used in radio type speakers. The reduced portion 44 is peened over as at 52 firmly to hold the cup 50, the central portion of the spider 48 and the washer 46 tightly together. A peripheral flange 54 on the spider 48 is held to a steel bracket member 56 by tongues 58 on the latter and an annular spring member 59. The bracket element 56 is held by welding to one component of what may be termed a two component motor generally indicated at 60. One of these components is a steel plate U-shaped in cross section and having a circular hole in its upper portion. A cylindrical magnet 62 is added thereto in alignment with the hole in the U-shaped plate and soldered in place at its base. A circular steel pole piece 64 is soldered to the top of magnet 62 and centered in the circular opening of the U-shaped plate. In the cross-sectional view the pole piece 64 is shown interposed between two opposed ferrous leg pieces 66 and 68 of the U-shaped component. The pole piece 64 and the permanent magnet 62 are in axial alignment with the valve 24. The opposed leg portions 66 and 68 are welded to a base steel piece 70 of the U-shaped component which in turn is fastened to the lower wall 16 of the box by means of plastic rivets 72. An insulating sheet 71 of paper is interposed between the wall 16 and the base piece 70.

The outside lower half of the wall of the cup 50 is wound with an electro-magnetic coil 76 fastened in place by means of an adhesive. This coil 76 together with the wall of the cup 50 is free to move axially in a space 80 provided between each leg 66 and 68 and the corresponding sides of the pole piece 64. Leads 82 and 84 are provided for the coil 76 and these leads pass through openings 86 and 88 formed in the cup 50, the spider 48, and the washer 46.

In the specific use to which the illustrated arrangement is to be put, the valve 18 is for the purpose of regulating a vacuum supply so that the degree of vacuum, whether heating or air conditioning is required in a car interior, is modified by the conditions obtaining. Thermistors sense the temperature conditions and the data obtained is transferred through a suitable amplification system. The latter sends signals in the form of a varying voltage to the motor 60 for operating the valve 18 and thereby controlling the degree of vacuum as a means for controlling the heating and air conditioning system used. The valve or control element 24 is biased toward its closed position by the spring 26. It may be moved in the other direction or opened by the chain 38 as pulled by the motor 60 to apply vacuum an extent dictated by the thermistor signals.

With no current passing through the coil 76, the lines of force continually developed by the permanent magnet 62 continually traverse the annular air gap 80 but with no effect on the position of the coil. As voltage is applied across the coil terminals 82 and 84, however, the fields of force generated by the coil current interact with the fields of force of the magnet 62 with the result that the coil will be drawn downwardly into the air gaps 80 with a force proportional to the voltage applied to the coil. Application of this force to the control element 24 by means of the chain 38 against the resistance of the spring 26 supplies a vacuum proportional to the applied force and, therefore, to the voltage applied to the coil.

Previous calculations indicated that a motor of the radio type would not generate sufficient power to position a vacuum valve or similar control element without exceeding the heat dissipation capabilities of the motor. A force of about one pound and a stroke of about ⅛ of an inch was needed and it was desirable to develop this work potential with about 5 to 10 watts of electrical energy. Experience has shown, however, than a one pound force could be moved the required distance when 6 to 8 watts are applied to a 4 ohm radio coil. The motor coil 76 need only be connected in the blower motor circuit of the heater system, either in series with the motor, in shunt with the field, on in shunt with the armature and as the voltage in the motor circuit varies, a smooth control of the vacuum is achieved.

A direct current is preferable in effecting operation but the apparatus will also operate with alternating current wherein average current will serve as the operating factor.

I claim:

1. A magnetic transducer arrangement including a control unit including a control element movable and effective within a given range of movement with respect to a support, spring means urging said control element in one direction, a motor having two realtively movable components, one of said components defining at least one air gap and including a permanent magnet and a field case of ferruginous material fixed in position relative to said support, said magnet having a first magnetic flux circuit completed through said field case and air gap, the other of said components including an electro-magnetic coil resiliently connected to said one component and extending into said air gap, means coupling said coil to said control element, and the arrangment being such that energizing of said coil completes a second magnetic flux circuit in interaction with said first flux circuit across said air gap to urge said control element in the other direction against the loading of said spring means.

2. A magnetic transducer arrangement including a movably mounted control element effective within a range of travel, a motor and spring means cooperatively urging the control element in opposite directions, said motor having a fixed component and a movable component, the said fixed component defining at least one air gap and including a permanent magnet creating a first magnetic flux flow across said air gap, the said movable component including an electro-magnetic coil coupled to said control element and extending into said air gap, resilient means connecting said components to retain said air gap, and the arrangement being such that energizing of said coil completes a second magnetic flux flow in interaction with said first flux flow across said air gap and urging said control element against the loading of said spring means.

3. A magnetic transducer arrangement including a control element biased in one direction by spring means, a motor having a fixed component and a movable component connected by a resilient disk, the said fixed component having two opposed ferrous portions and a permanent magnet, the said movable component including an electro-magnetic coil coupled to said control element and interposed between and in movable relation with said ferrous portions, and the arrangement being such that energizing of said coil effects an interaction of a field of force with a magnetic flux flow through said ferrous portions adequate to move said control element in the other direction a distance dependent upon the extent of the energizing of said coil.

4. A magnetic transducer arrangement including a control element biased in one direction by spring means, a motor having two relatively movable components, resilient means connecting said compononets, one of said components having a part U-shaped in cross-section with opposed ferrous portions and a central permanent magnet, the said movable component including an electro-magnetic coil and being coupled to said control element, said coil being located between said ferrous portions and extending in a plane traversing the latter, and the arrangement being such that energizing of said coil will move said control element against the force exerted by said spring in proportion to said energizing.

5. A magnetic transducer arrangement including a control element, spring means biasing said element in one direction, a motor having two relatively movable components, a resilient disk connecting said components to confine their relative motion along a given path, one of said components being fixed and having a U-shaped part and including a pole piece and a permanent magnet, said pole piece being of electro-magnetic material and located within the U-shaped part, the other of said relatively movable components including an electro-magnetic coil coupled to said control element and extending in a plane lying across the end portions of said U-shaped part, and the arrangement being such that energizing of said coil will move said control element a distance proportional to the current supplied said coil.

6. A magnetic transducer arrangement including a control element, spring means biasing said element in one diretcion, a motor having two relatively movable components, a resilient disk having its periphery fixed to one of said components and its center fixed to the other to confine their relative motion along a given linear path, the said one of said components including a permanent magnet and a ferrous pole piece in axial alignment with the said disk and two ferrous end portions extending along opposite sides of said pole piece and magnet, the other of said components including a cup of non-magnetic material fixed to the center of said disk and carrying an electro-magnetic coil freely movable between said end portions and said pole piece, means coupling said disk center to said control element and extending in the direction of said linear path, and the arrangement being such that energizing of said coil will move said cup, coupling means and control element a distance in accordance with the current supplied to said coil.

References Cited in the file of this patent

UNITED STATES PATENTS

| 2,661,412 | Dreyfus | Dec. 1, 1953 |
| 3,014,099 | Fiala | Dec. 19, 1961 |

FOREIGN PATENTS

| 424,720 | Italy | Aug. 28, 1947 |